United States Patent [19]

Hooper, Sr.

[11] Patent Number: 5,325,841
[45] Date of Patent: Jul. 5, 1994

[54] BARBECUE APPARATUS AND METHOD

[76] Inventor: Virgil Hooper, Sr., 700 Johnson Dr., Richmond, Calif. 94806-1748

[21] Appl. No.: 14,139

[22] Filed: Feb. 5, 1993

[51] Int. Cl.[5] ............................................. A47J 37/00
[52] U.S. Cl. ................... 126/25 R; 126/9 R; 126/275 R; 99/339; 99/340; 99/447
[58] Field of Search ............... 126/25 R, 41 R, , 9 R, 126/275 R, 312, 25 A, 25 B, 29, 30, 292, 293; 99/340, 339, 447, 481, 482

[56] References Cited

U.S. PATENT DOCUMENTS

| | | | |
|---|---|---|---|
| 3,354,848 | 11/1967 | Tolston | 126/25 R |
| 3,974,760 | 8/1976 | Ellis | 126/25 A |
| 4,026,265 | 5/1977 | Spadaro | 126/25 R |
| 4,094,295 | 6/1978 | Boswell et al. | 126/25 R |
| 4,471,751 | 9/1984 | Hottenroth | 126/25 R |
| 4,489,706 | 12/1984 | Hait | 126/9 R |
| 4,532,911 | 8/1985 | Orter | 126/27 |
| 4,604,986 | 8/1986 | Barnes | 126/9 R |
| 4,700,618 | 10/1987 | Cox, Jr. | 126/25 R |
| 4,706,643 | 11/1987 | Tyson | 126/25 R |
| 4,840,118 | 6/1989 | Rinehart | 126/25 R |
| 5,086,752 | 2/1992 | Hait | 126/9 R |
| 5,144,939 | 9/1992 | Christopherson | 126/25 R |

Primary Examiner—James C. Yeung
Attorney, Agent, or Firm—Thomas R. Lampe

[57] ABSTRACT

Barbecue apparatus includes a housing and a top defining a primary vent interconnecting the interior of the housing to the ambient atmosphere. A fuel grate is located within the housing interior spaced from the housing bottom. A grill is located in the housing interior at a location between the fuel grate and the primary vent. A secondary vent is positioned below the grill and above the grate for venting potentially harmful combustion gases, such as carbon monoxide gas, from the housing interior.

7 Claims, 4 Drawing Sheets

BARBECUE APPARATUS AND METHOD

TECHNICAL FIELD

This invention relates to a barbecue system, and more particularly, to a deep pit barbecue apparatus and method for barbecuing meat and other foods.

BACKGROUND ART

Many systems are known in the prior art for cooking meats and other foods outdoors. Among devices of this type are covered cookers or closed barbecue pits, often referred to as "smokers". Closed cookers generally use combustible fuel in the form of wood charcoal. Holes in the bottom of the unit admit air for supporting the combustion and a damper at the top of the device controls release of the heated air and smoke. The food cooks in the hot gases and smoke, free of open flame. Because there is no flame, the cooking temperatures are much lower than those found with respect to open flame barbecues; consequently, covered cookers or closed barbecues can be left unattended for long periods of time.

Closed barbecues are commonly constructed of metal and are the modern equivalent of the barbecue pits long employed in the southern portion of the United States in which an open fire has been made in a pit lined with stone. After the fire heated the stones, the meat was wrapped, placed on the stones, and the pit was covered to prevent any combustion of the meat or wrapper from occurring.

While modern metal enclosed cookers are highly convenient and the food bears more than a passing resemblance to southern barbecue pit cooked food, the present day devices do have drawbacks.

Perhaps the greatest drawback of all is that closed cookers can and often do produce harmful carbon monoxide gas which contacts the food being cooked for prolonged periods of time. Of course, carbon monoxide gas is also produced by open barbecue cookers but the gas is readily dissipated or converted in such an arrangement because of direct exposure to the air. The essence of closed cookers is, however, the fact that they are substantially closed to the outside atmosphere, admitting air only through the bottom of the cooker.

Prior art closed cookers are also relatively thermally inefficient, at least partially due to the fact that calories are lost during the conversion of carbon dioxide first formed by the burning of the fuel to carbon monoxide.

Applicant is aware of the following United States Patents, which are believed to be representative of the current state of the barbecue cooker art, including the closed cooker art: U.S. Pat. Nos. 5,144,939, issued Sep. 8, 1992, 5,086,752, issued Feb. 11, 1992, 4,604,986, issued Aug. 12, 1986, 4,471,751, issued Sep. 18, 1984, 4,706,643, issued Nov. 17, 1987, 4,532,911, issued Aug. 6, 1985, 4,489,706, issued Dec. 25, 1984, 4,094,295, issued Jun. 13, 1978, 4,026,265, issued May 31, 1977, 3,974,760, issued Aug. 17, 1976, and 3,354,848, issued Nov. 28, 1967.

DISCLOSURE OF INVENTION

The present invention relates to apparatus which is relatively simple, inexpensive, and easy to maintain, but which reliably cooks meat and other foods in a manner similar to the true southern barbecue pit approach.

The apparatus and method of the present invention include an approach for allowing the escape of combustion gases, including carbon monoxide gas, before they are significantly exposed to the food being cooked. The approach of the present invention allows for the barbecue of meat in a superior manner with a high degree of thermal efficiency. Thus, less fuel is expended than is the case with most barbecue closed cookers of like capacity.

The barbecue apparatus of the present invention includes a housing having a bottom, a peripheral wall extending upwardly from the bottom, and a top. The bottom, peripheral wall, and top define a housing interior. The top defines a primary vent leading from the housing interior to the ambient atmosphere.

A fuel grate is disposed within the housing interior adjacent to the bottom and spaced from the bottom to support combustible fuel.

A grill having openings is positioned within the housing interior at a location between the fuel grate and the primary vent.

A secondary vent in positioned below the grill and above the grate for venting potentially harmful combustion gases from the housing interior into the ambient atmosphere to prevent contamination of food on the grill by the vented combustion gases. The secondary vent comprises a plurality of secondary vent holes formed in the peripheral wall closely adjacent to the grill. Closure means is provided for selectively adjusting the effective size of at least some of the secondary vent holes.

The top defines an elongated passageway extending upwardly from the housing interior and leading to the primary vent. The apparatus includes control means for controlling gas flow through the elongated passageway and out the primary vent for maintaining a positive pressure within the housing interior at the location of the secondary vent holes to promote the passage of combustion gases outwardly into the ambient atmosphere through the secondary vent holes.

The method for barbecuing food of the present invention includes the step of combusting fuel adjacent to the bottom of a housing having a bottom and a peripheral wall extending upwardly from the bottom and defining an interior.

The method includes flowing combustion gases upwardly from the fuel toward a grill within the housing interior and venting combustion gases from the housing interior through vent holes in the housing into the ambient atmosphere before the vented combustion gases reach the grill.

Simultaneously with the venting step, food is cooked on the grill by the heat created from the fuel. Those gases which were not vented prior to reaching the grill, along with smoke produced during the step of cooking the food, are expelled from the housing interior into the ambient atmosphere at a location above the grill.

The method also includes the step of creating a positive pressure condition within the housing interior at the vent holes to promote the flow of combustion gases through the vent holes into the ambient atmosphere. The combustion gases flowing through the vent holes typically include carbon monoxide gas.

Other features, advantages, and objects of the present invention will become apparent with reference to the following description and accompanying drawings.

BEST MODE FOR CARRYING OUT THE INVENTION

Figure 1:
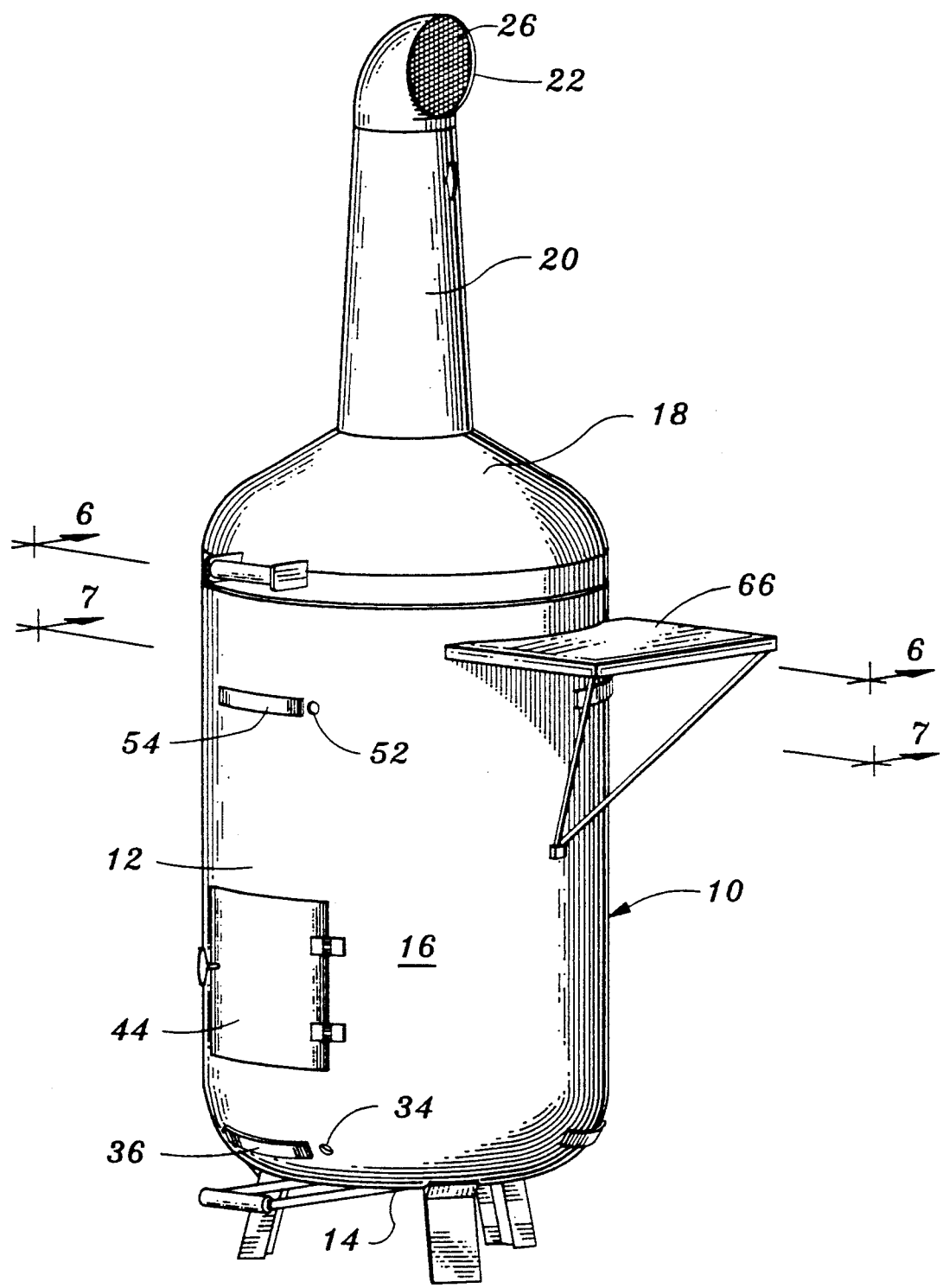
FIG. 1 is a perspective view of apparatus constructed in accordance with the teachings of the present invention.
Figure 2:
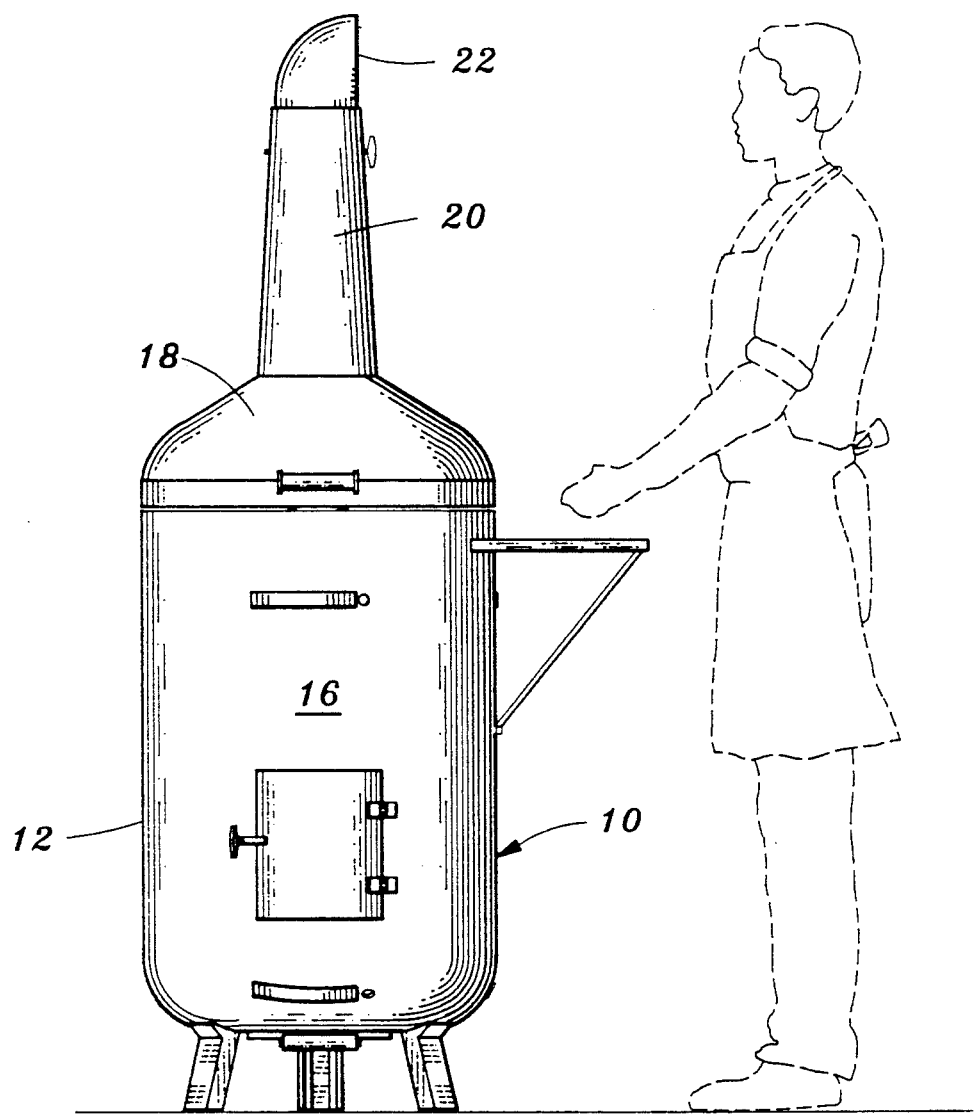
FIG. 2 is a front, elevational view of the apparatus along with the outline of a person using the apparatus.

Referring now to the drawings, apparatus constructed in accordance with the teachings of the present invention is designated by reference numeral 10. The apparatus 10 includes a housing 12 having a bottom 14 and a circular-shaped peripheral wall 16 extending upwardly from the bottom. The housing additionally includes a top 18. The bottom, the peripheral wall, and the top define a housing interior.

Top 18 includes a chimney 20 having a primary vent 22 formed in a side thereof. The chimney defines an elongated passageway 24 leading from the housing interior to the primary vent 22. A screen 26 is connected to the chimney over the primary vent to operate as a spark arrestor.

A fuel grate 30 is disposed within the housing interior adjacent to bottom 14 and spaced from the bottom to support combustible fuel such as wood charcoal 32. The area or zone immediately above the fuel grate may be considered a fuel combustion chamber.

Holes 34 are formed in the housing 12 at the bottom below the grate 30. Ambient air is drawn through the holes 34 in a conventional manner during combustion of the fuel. One or more closures, such as slide 36, may be utilized to cover and uncover holes 34. The area below the fuel grate 30 may thus be considered an air intake chamber.

Figure 3:
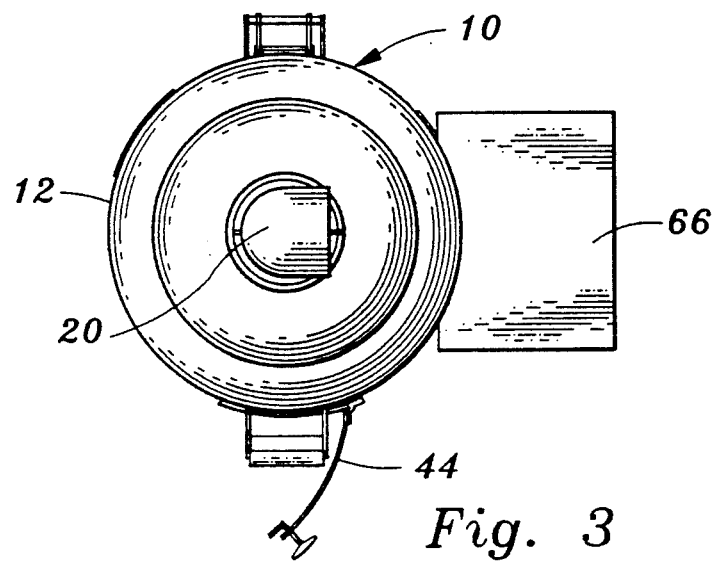
FIG. 3 is a top, plan view of the apparatus.
Figure 5:
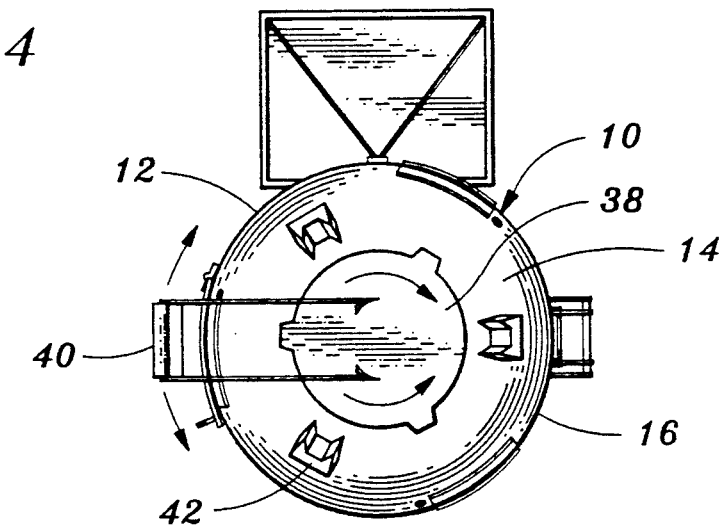
FIG. 5 is a bottom view of the apparatus.

If desired, the bottom 14 may include a bottom closure or hatch 38 of any known, suitable type which may be selectively removed from the rest of the housing by manipulation of a handle 40 as represented by the arrows in FIG. 5. Such a feature is well known in the prior art and will not be described further. Legs 42 project downwardly from bottom 14 and are utilized to support the apparatus on the ground or other support surface. A fire box door 44 provides access to the interior of the housing above the fuel grate so that fuel can be replenished as needed. The door is shown open in FIG. 3.

A grill 50 having a plurality of openings therein is positioned within the housing interior at a location between fuel grate 30 and primary vent 22. In the practice of the present invention, it is preferred that the grill be spaced at least 2½ feet from the bottom 14.

An important feature of the present invention is the incorporation of a secondary vent positioned below the grill and above the grate for venting potentially harmful combustion gases from the housing interior into the ambient atmosphere to prevent contamination of food on the grill by the vented combustion gases. The combustion gas of primary concern is carbon monoxide gas which is a conventional byproduct of burning wood charcoal in an enclosed environment such as that created by closed cookers or deep pit barbecues.

The secondary vent comprises a plurality of secondary vent holes 52 formed in peripheral wall 16 closely adjacent to the grill, preferably about 3 inches or so from the grill. Closure means in the form of a closure slide 54 of any known construction may be utilized to selectively cover and uncover the secondary vent holes 52. In the arrangement shown, the secondary vent holes 52 are arrayed in sets of three about the periphery of the wall 16.

In order for the apparatus to function in a manner that will vent at least some of the harmful combustion gases out of the housing interior before contacting meat or other food being cooked, it is necessary to maintain a positive pressure, i.e. a pressure greater than the pressure of the ambient atmosphere, in the vicinity of the secondary vent holes. This may be accomplished by adjusting damper 58 including a damper blade disposed within passageway 24 and a handle exterior of chimney 20.

Figure 6:
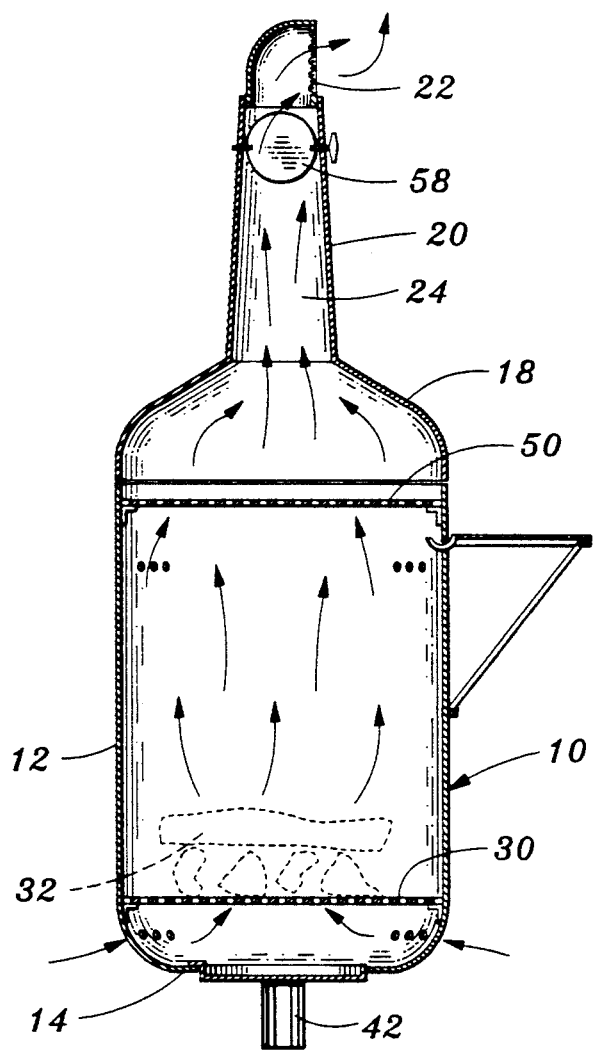
FIG. 6 is a cross-sectional, side view of the apparatus illustrating diagrammatically the flow of gases therein with the damper fully open.

FIG. 6 shows the damper 58 completely open, thus allowing the maximum flow of gases upwardly through the chimney 20 and out primary vent 22 as shown by the arrows. As illustrated, there is little or no positive pressure at the secondary vent holes 52, although, of course, this depends upon the precise configuration of the apparatus. It is within the scope of the present invention to provide a form of apparatus in which some degree of positive pressure will be at the secondary vent holes even when a damper is fully opened.

Figure 7:
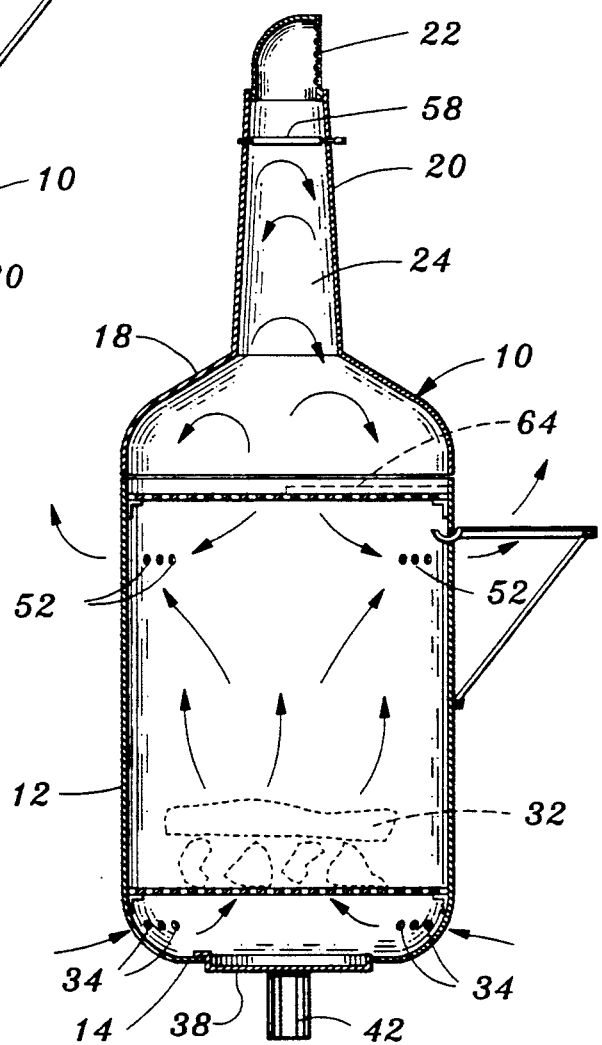
FIG. 7 is a view similar to FIG. 6, but illustrating the damper in fully closed position.

FIG. 7 illustrates the condition wherein the damper is fully closed. No gases are being emitted from primary vent 22 and any gases which exit have to exit through secondary vent holes 52. Of course, this normally is not a desirable condition since the size of the secondary vent holes may be insufficient to ensure proper venting and maintain the combustion of the fuel.

The optimum condition is to adjust the damper 58 so that it is somewhere between a fully open and a fully closed condition. This will provide for venting of some combustion gases through the secondary vent holes while allowing some flow through the chimney so that smoke is dissipated. A user can readily detect the amount of flow through the secondary vent holes to provide guidance with regard to degree of adjustment.

Another approach to providing a positive pressure within the housing interior at the location of the secondary vent holes is to block some of the openings in the grill element to restrict the flow of hot gases to only a portion of the grill. This can be accomplished quite simply by positioning a gas impervious, non-combustible sheet, such as an aluminum sheet, over or under the grill, it being understood that the sheet covers only a portion of the grill. The sheet, shown in FIG. 7 by dash lines and designated by reference numeral 64, may be rigid so that it acts as a fry or grill sheet or may simply be aluminum foil wrapped over or under a portion of the grill.

Figure 4:
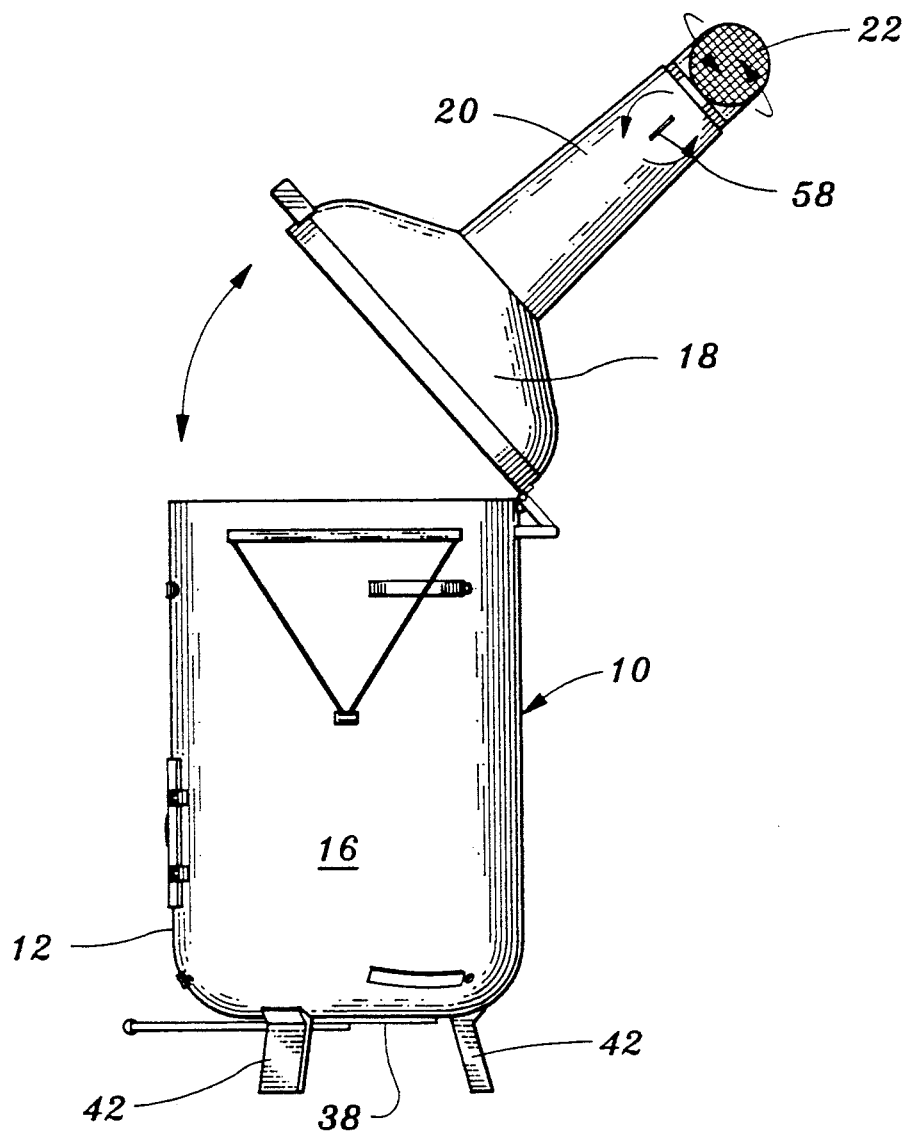
FIG. 4 is a right side, elevational view of the apparatus and showing the top thereof tilted to open position.

The top is hinged so that it may be tilted, as illustrated in FIG. 4. The apparatus may employ a variety of other conventional grill or cooker features such as work platform 66.

The principals of the present invention are applicable to any size; however, it has been found particularly appropriate to make the lower part of the housing comprising bottom 14 and peripheral wall 16 the size of a 55 gallon drum.

I claim:

1. Deep pit barbecue apparatus comprising, in combination:
 a housing having a bottom, a peripheral wall extending upwardly from said bottom, and a top disposed over said bottom, said bottom, peripheral wall, and top defining a housing interior, and said top defining a primary vent over said bottom interconnecting said housing interior to the ambient atmosphere;
 a fuel grate located under said primary vent disposed within said housing interior closely adjacent to said bottom and spaced from said bottom to support combustible fuel;
 a grill having grill openings positioned within said housing interior at a location between said fuel grate and said primary vent, said grill being located at least about 2½ feet over the housing bottom and directly above said fuel grate and directly under said primary vent; and
 a secondary vent positioned below said grill and above said grate for venting potentially harmful combustion gases from said housing interior into the ambient atmosphere to prevent contamination of food on said grill by said vented combustion gases, said secondary vent comprising a plurality of spaced secondary vent holes formed in said housing peripheral wall under and closely adjacent to said grill and closure means for selectively adjusting the effective size of at least some of said secondary vent holes, and said housing defining air intake holes below said fuel grate to replace gases emitted by said apparatus through said primary vent and said secondary vent with ambient air, said top defining an elongated passageway extending upwardly from said housing interior and leading to said primary vent, said apparatus including control means for controlling gas flow through said elongated passageway and out said primary vent for maintaining a positive pressure within said housing interior at the location of said secondary vent holes below and closely adjacent to said grill to promote the passage of combustion gases outwardly from said housing interior closely adjacent to said grill and directly into the ambient atmosphere through said secondary vent holes, said control means comprising a selectively positionable damper in said passageway adjacent to said primary vent to vary the effective size of said passageway.

2. The apparatus according to claim 1 wherein said top includes a chimney defining said elongated passageway, said primary vent being formed in a side of said chimney.

3. The apparatus according to claim 2 wherein a spark arrestor is connected to said chimney over said primary vent.

4. The apparatus according to claim 1 additionally comprising a non-combustible, substantially gas impervious sheet selectively connectable to said grill to close a predetermined number of the openings in the grill to restrict the flow of hot gases through said grill and promote the flow of gases through said secondary vent holes.

5. The apparatus according to claim 1 wherein said secondary vent holes are located about 3 inches from said grill.

6. The apparatus according to claim 1 wherein said top is hingedly connected to the remainder of said housing.

7. The apparatus according to claim 1 wherein the bottom and peripheral wall of said housing are generally the size of a 55 gallon drum.

* * * * *